(12) United States Patent
McFarthing

(10) Patent No.: US 8,879,988 B2
(45) Date of Patent: Nov. 4, 2014

(54) RECEIVER FOR A TELECOMMUNICATIONS SYSTEM

(71) Applicant: Cambridge Silicon Radio Limited, Cambridge (GB)

(72) Inventor: Anthony McFarthing, Cambridgeshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 146 days.

(21) Appl. No.: 13/719,434

(22) Filed: Dec. 19, 2012

(65) Prior Publication Data

US 2014/0170970 A1  Jun. 19, 2014

(51) Int. Cl.
*H04B 5/00* (2006.01)
*H04B 7/00* (2006.01)

(52) U.S. Cl.
CPC ................................. *H04B 5/0062* (2013.01)
USPC ................... 455/41.1; 455/41.2; 455/226.1

(58) Field of Classification Search
USPC ............... 455/41.1, 41.2, 41.3, 226.1, 226.2; 340/10.1, 10.5, 505, 572.1, 572.7
See application file for complete search history.

(56) References Cited

U.S. PATENT DOCUMENTS

| 7,817,015 | B1 | 10/2010 | Tiernay et al. |
| 8,620,218 | B2 * | 12/2013 | Awad ........................... 455/41.2 |
| 8,761,666 | * | 6/2014 | Clarke ......................... 455/41.1 |
| 2011/0102151 | A1 | 5/2011 | Shin et al. |

FOREIGN PATENT DOCUMENTS

| EP | 1884880 | 7/2009 |
| JP | 2009060415 | 3/2009 |

OTHER PUBLICATIONS

Search Report for GB Appln. No. 1318965.9, dated Feb. 27, 2014.

* cited by examiner

*Primary Examiner* — Quochien B Vuong
(74) *Attorney, Agent, or Firm* — RatnerPrestia

(57) ABSTRACT

Methods and apparatus in a near-field communication system, in which a modulated signal received in a Reader is clipped by applying upper and lower clip levels. After clipping, the modulated part of the signal corresponds to a greater portion of the overall signal, and thus the requirements placed on an analog-to-digital converter for the clipped signal are reduced. In a first mode of operation, prior to or at the start of reception of the load-modulated signal, the clip levels may be set in a feedforward manner on the basis of preset values or a detected change in the overall signal; in a second mode of operation, once the clipped signal is available, the clip levels may be set in a feedback manner on the basis of the clipped signal.

15 Claims, 3 Drawing Sheets

— Modulated Signal
— · Upper clip level
— · · Lower clip level
— Clipped/Filtered Signal

RECEIVER FOR A TELECOMMUNICATIONS SYSTEM

TECHNICAL FIELD

The present invention relates to telecommunications and particularly to a receiver for use in a near-field communications system.

BACKGROUND

Near-field communication (NFC) systems involve active devices, which have a power supply, and passive devices which typically do not. Active devices generate large radio-frequency signals which are used to communicate with the passive devices, but also to power them through magnetic induction. Thus, when the active device is brought sufficiently close to the passive device (typically under 20 cm), the RF field generated by the active device is used to power the passive device. In this application, active devices are termed Readers, while passive devices are termed Tags.

The Reader of an NFC system, when communicating with a passive Tag, is required to provide a large input signal level so the energy in the signal can be harvested by the Tag in order to provide the power it needs to function correctly. During communications from the Reader to the Tag, the large RF signal generated by the Reader is modulated with data; the Tag is then required to recover the data by demodulation. During communications from the Tag to the Reader, the Reader provides a large, unmodulated RF field which can be used to power the Tag. The Tag can then communicate back to the Reader by loading the RF field in an on/off keying way that is referred to as load modulation. The modulation can be based on amplitude, phase, or a combination of both. However, the amplitude of the modulation is much lower than the amplitude of the RF signal.

The Reader receiver is therefore required to demodulate a signal consisting of a large amplitude carrier with a very low level modulation. The analogue-to-digital converter (ADC) in the receiver will therefore need to be sized in terms of the number of bits so the inputted signal does not amplitude limit but still permits the small levels of modulation to be detected without an undue amount of ADC produced quantisation noise. This can lead to a complex ADC requirement with a large number of bits.

When analogue receivers are used for NFC, the input signal is mixed down to baseband so that the large carrier signal becomes a DC level. Usually a low-pass filter with an integrator in its feedback loop can be used to attenuate the DC signal without affecting the modulation, thereby reducing the composite input signal to the ADC and reducing the need for a complicated ADC. With a bandpass ADC that digitises the 13.56 MHz input signal, however, this technique cannot be used.

SUMMARY OF INVENTION

According to a first aspect of the present invention, there is provided a near-field communication device for communicating with and powering a passive device, the near-field communication device comprising: an antenna; one or more amplitude limiters, arranged to apply upper and lower clip levels to a signal in the antenna, the signal comprising an unmodulated component for transmitting power to the passive device, and a modulated component corresponding to data transmitted by the passive device, the one or more amplitude limiters being further arranged to provide a clipped signal corresponding to a combination of a first portion of the signal below the lower clip level, and a second portion of the signal above the upper clip level; and processing circuitry, for demodulating the clipped signal.

According to a second aspect of the present invention, there is provided a method of communicating with a passive device in a near-field communication system, the method comprising: applying upper and lower clip levels to a signal in an antenna, the signal comprising an unmodulated component for transmitting power to the passive device and a modulated component corresponding to data transmitted by the passive device, to provide a clipped signal corresponding to a combination of a first portion of the signal below the lower clip level, and a second portion of the signal above the upper clip level; and demodulating the clipped signal.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
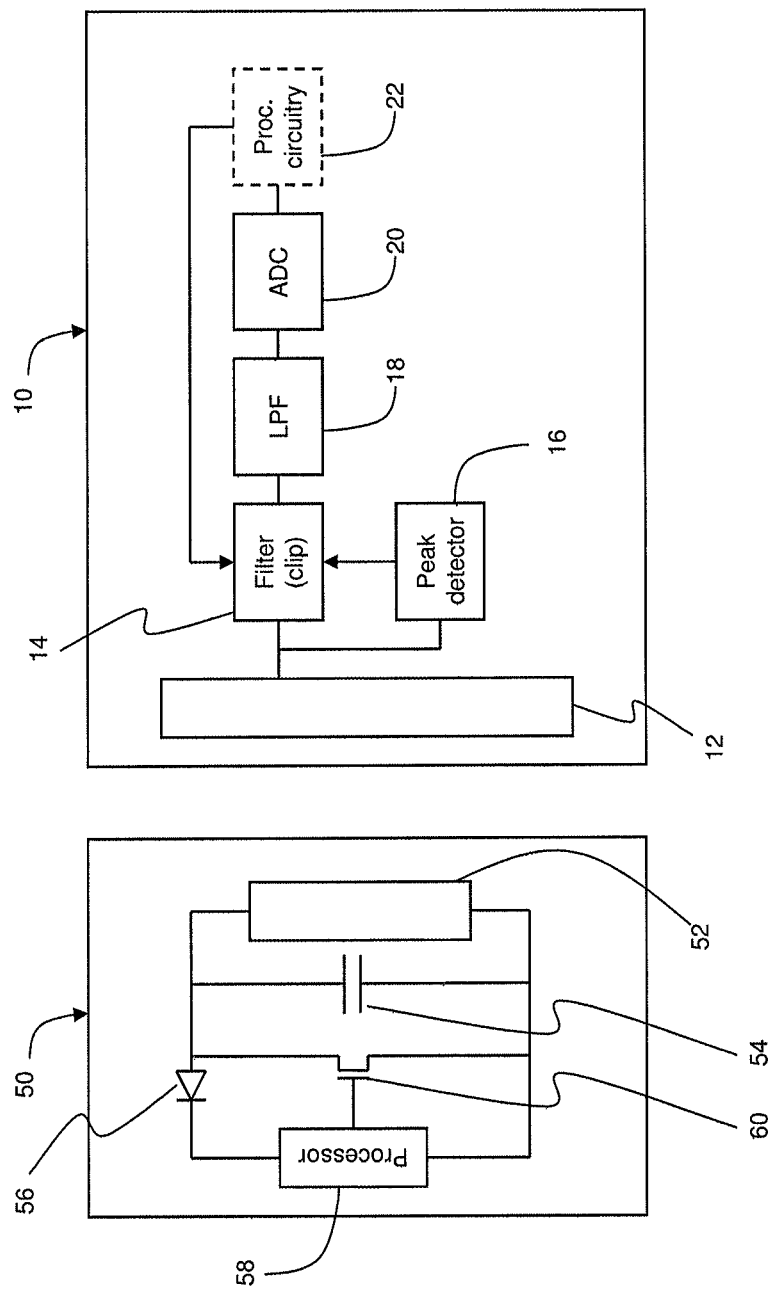
FIG. 1 is a schematic diagram of a Reader and a Tag according to embodiments of the present invention.

FIG. 1 is a schematic diagram of a Reader 10 and a Tag 50 according to embodiments of the present invention.

The Reader 10 comprises an antenna 12 with which signals can be transmitted and received, coupled to a receive Rx chain for processing signals received in the antenna 12. Those skilled in the art will appreciate that the antenna 12 will also be coupled to a transmit Tx chain in order to modulate the antenna signal to transmit data; however, this is not relevant to a description of the present invention and is therefore not illustrated for clarity. The first element in the Rx chain is an amplitude limiter 14 which applies upper and lower clipping levels to the signal in the antenna in a manner which will be described in further detail below. A peak detector 16 (also known as an envelope detector) is also coupled to the antenna 12, and sets the upper and lower clipping levels used in the amplitude limiter 14.

The clipping process may, in general, introduce high-frequency artefacts not present in the original signal. In order to reduce or eliminate these artefacts, the signal is passed to a low-pass filter 18, which smoothes the clipped signal in a manner described in greater detail below.

The smooth, clipped signal is then passed to an analogue-to-digital converter (ADC) 20, which converts the analogue signal to digital. The digital signal can then be passed to processing circuitry 22 for demodulation and further processing. As will be explained in greater detail below, the processing circuitry 22 may also be used to set the upper and lower clipping levels in the amplitude limiter 14.

The Tag 50 comprises an antenna 52 which acts both as a means for communication with the Reader and a power source (through induction). During communication between the Reader 10 and the Tag 50, a high-strength signal is generated in the antenna 12. If the Reader 10 is transmitting data to the Tag, this signal will be modulated; if the Reader is receiving data from the Tag, the signal will be unmodulated. The Reader 10 is brought close to the Tag 50 and magnetic induction between their respective antennas 12, 52 causes a current to be induced in the antenna 52.

In the illustrated embodiment, the Tag 50 further comprises a capacitor 54 connected in parallel between the respective terminals of the antenna 52, and a diode 56 coupled to one terminal of the antenna 52 in order to rectify the signal generated therein. Processing circuitry 58 coupled to the antenna 52 is powered by the signal induced in the antenna 52 in order to carry out its function. For example, if the signal generated by the Reader 10 is modulated, the processing circuitry 58 may demodulate the signal to acquire the data which was transmitted.

Figure 3:
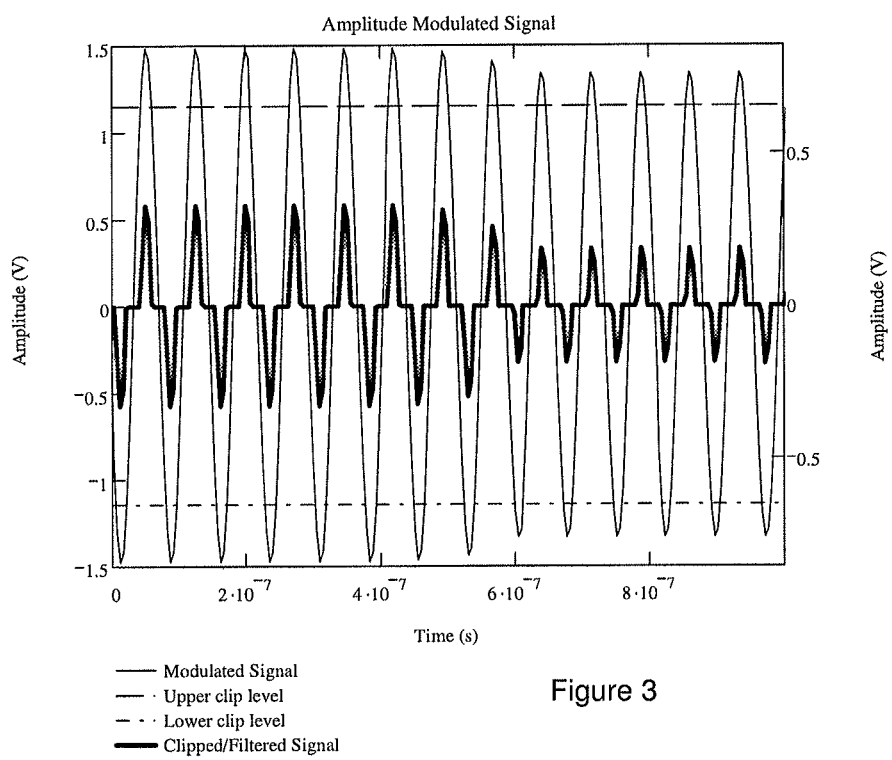
FIG. 3 is a diagram showing clipping of a load-modulated signal according to embodiments of the present invention.

The processing circuitry 58 is also responsible for generating a signal to be sent back to the Reader 10, and in order to do that a variable resistive element 60 is provided, connected in parallel with both the capacitor 54 and the antenna 52. For example, the variable resistive element 60 may be switchable between two or more values of resistance. In the illustrated embodiment the switchable resistive element 60 is a transistor, with its gate terminal controlled by the processing circuitry 58, and its source and drain terminals connected to respective terminals of the capacitor 54 and the antenna 52. During a time period for communications from the Tag 50 to the Reader 10, the Reader generates an unmodulated, high-strength rf signal in the antenna 12. By selectively switching the resistive element 60, the impedance of the Tag (i.e. the load seen by the Reader 10) can be altered. This is seen in the Reader 10 as a low-level modulation of the signal in the antenna 12, as the load is altered, and such load modulation can be used to transmit data to the Reader 10. FIG. 3 shows such a load-modulated signal (relatively thin solid line).

The present invention relates primarily to the detection and demodulation of the signal in the Reader 10; the Tag 50 shown in FIG. 1 is therefore provided only as an illustrative example of how the signal may be modulated. Those skilled in the art will appreciate that any method or combination of features may be used in the Tag 50 to modulate the signal generated in the antenna 12 of the Reader 10, without departing from the scope of the present invention. For example, more complex arrangements may be provided in order to modulate the signal between signal levels representing multiple bits.

The Rx chain in the Reader 10 is thus required to demodulate a low-level modulation of a high-strength signal. In order to simplify this process, according to embodiments of the present invention, the amplitude limiter 14 applies upper and lower clipping levels to substantially remove the middle part of the signal detected in the antenna 12. That is, the amplitude limiter 14 removes a portion of the signal extending from a lower clipping level to an upper clipping level, and recombines the portions of the signal which lie below and above those clipping levels, respectively, to form a new "clipped" signal in which the modulated portion of the signal represents a much greater percentage of the overall signal.

In some embodiments, the clipped signal may represent substantially only the modulated part of the signal (with modulation between maximum and minimum signal levels changing the clipped signal from its maximum to at, or near, the signal zero value).

The lower clipping level may be positioned at a signal amplitude above the signal's minimum value, but below the signals mean average value (or the midpoint between the signal's minimum and maximum values). The upper clip level may be positioned at a signal amplitude below the signal's maximum value, but above the signals mean average value (or the midpoint between the signal's minimum and maximum values).

Figure 2:
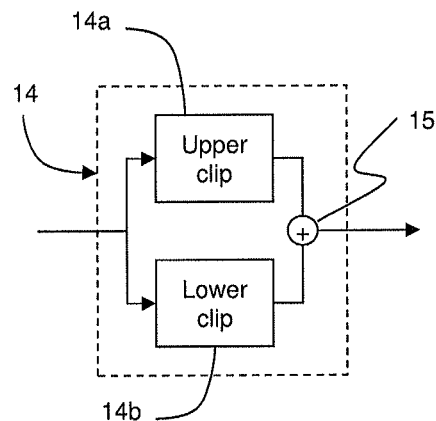
FIG. 2 is a schematic diagram of an amplitude limiter according to embodiments of the present invention.

FIG. 2 shows an example of an amplitude limiter 14 according to embodiments of the present invention. The amplitude limiter 14 comprises two modules, an upper amplitude limiter 14a and a lower amplitude limiter 14b for applying the upper and lower clip levels respectively. The signal in the antenna 12 is thus provided in parallel to each amplitude limiter 14a, 14b. The upper amplitude limiter 14a applies the upper clip level, and removes all parts of the signal falling below that clip level, while passing parts of the signal above the clip level. The lower amplitude limiter 14b applies the lower clip level and removes all parts of the signal falling above that clip level while passing parts of the signal below the clip level. The outputs of the two limiters 14a, 14b can then be combined in an adding element 15, and the combined clipped signal forwarded to the rest of the Rx chain.

Figure 4:
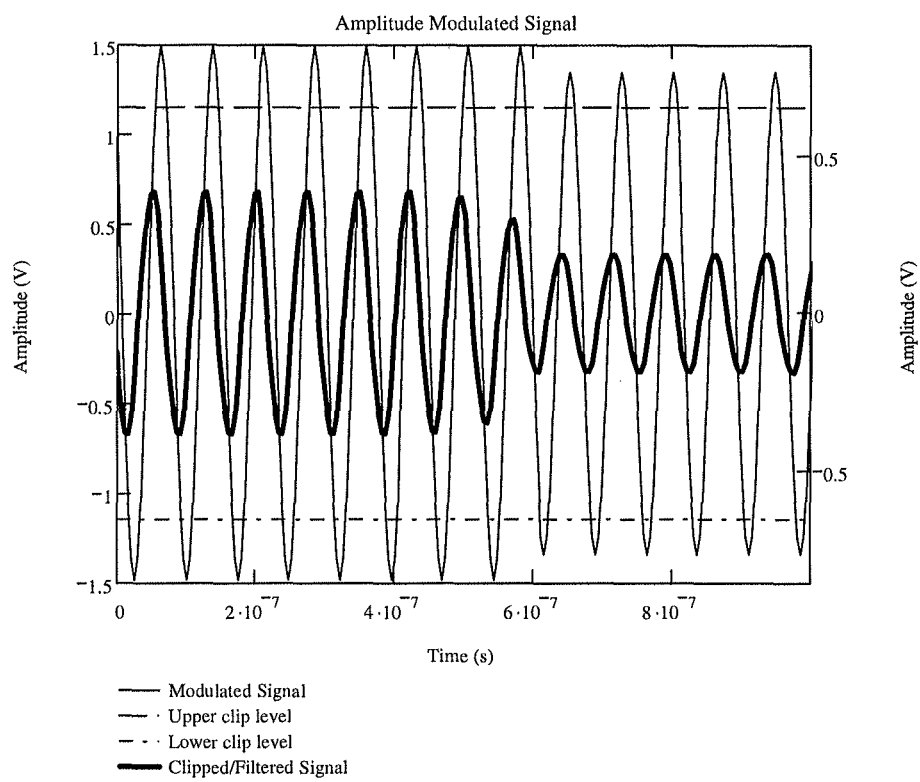
FIG. 4 is a diagram showing filtering of a clipped signal according to embodiments of the present invention.

FIG. 3 is a diagram showing clipping of a load-modulated signal according to embodiments of the present invention. The signal in the antenna 12 is shown by the solid, relatively thin line; the upper clip level is shown as a dashed line; the lower clip level is shown as a chained line; and the clipped signal is shown as a solid, relatively thick line. FIG. 4 shows similar data, following smoothing of the clipped signal by the low-pass filter 16.

As can be seen from these diagrams, prior to application of the amplitude limiter 14, the modulation of the signal in the antenna represents a relatively low percentage of the total signal amplitude. Converting that signal to digital thus requires a relatively complex ADC, with a large number of bits. After application of the amplitude limiter 14, the modulation of the signal has the same absolute amplitude, but represents a much greater percentage of the overall signal amplitude. The clipped signal can thus be converted to digital using an ADC which is simpler and requires fewer bits.

Prior to reception of the load-modulated signal the modulation level is unknown and therefore the upper and lower clip levels cannot be accurately set. This may lead to initial parts of any load-modulated signal being lost. Various methods are proposed to overcome this problem.

In a first mode of operation, before reception of a load-modulated signal, the peak detector 16 measures the maximum amplitude of the unmodulated signal. Any change in the detected signal level, or a change exceeding a threshold value, can then be presumed to be due to load modulation. The detected change in signal level is then used to preset the clip levels of the limiter 14 in a feedforward manner. For example, a look-up table may be provided to map the change in signal level to the required upper and lower clip level values.

Processing circuitry 22 has knowledge of the current state of the Reader 10, and in particular will know when a load-modulated signal is about to be received. For example, part of the transmission from the Reader 10 to the Tag 50 may provide some indication of a window in which the Tag 50 can communicate back to the Reader 10 through load modulation. At or around this time, the processing circuitry 22 can put the Reader 10 into the first mode of operation such that the peak detector 16 sets the upper and lower clip levels.

In a second mode of operation, the upper and lower clip levels are set on the basis of the received signal after application of the amplitude limiter 14, and possibly after application of the low-pass filter 18 and the ADC 20. Thus, when this detected signal becomes available, the clip level values can be controlled through a feedback mechanism.

A further method of setting the values of the clip levels relies on the observation that the signal to noise ratio (SNR)

will be lower when the electric field induced in the antenna 52 of the Tag is relatively weak (i.e. because the Tag 50 and the Reader 10 are far apart). In other words, when the Tag and Reader are close to each other, the modulated part of the signal is strong and can be relatively easily decoded in the Reader 10 (e.g. by processing circuitry 22). Conversely, when the Tag and Reader are relatively far apart, the modulated part of the signal is weak and the SNR low; it is in this situation where the invention is most beneficial (i.e. due to clipping in the amplitude limiter 14).

According to embodiments of the present invention, therefore, the peak detector 16 detects the current peak of the signal in the antenna 12 when a load-modulated signal from the Tag 50 is expected. The upper and lower clip levels are initially set to values just below upper maximum and just above the minimum peaks detected. For example, the upper clip level may be set to a value which is a predetermined percentage below the maximum signal level; the lower clip level may be set to a value which is a predetermined percentage above the minimum signal level. The predetermined percentage may be 5%, for example.

The predetermined percentage is set at a level which may be too close to the maximum and minimum values of the signal. For example, if the Reader 10 and Tag 50 are close to each other, the load-modulated part of the signal will be large and itself may be clipped by action of the amplitude limiter 14. However, as the load modulation in that case is large, the SNR is still expected to be at an acceptable level in spite of clipping of the modulated part of the signal. If the Reader 10 and Tag 50 are relatively far apart, the load modulated part of the signal should not be clipped due to the levels being set using the predetermined percentage. In that case, the SNR will be improved by action of the amplitude limiter 14.

After the Reader 10 has processed the signal using the preset values for upper and lower clip levels, a feedback mechanism can be employed to adjust the clip levels to more appropriate values. For example, if the load-modulated part of the signal is clipped by action of the amplitude limiter at the predetermined values, the percentage can be increased relative to the predetermined values (i.e. so that less of the signal is clipped). If the load-modulated part of the signal still represents only a small part of the signal even after action of the amplitude limiter, the percentage can be decreased below the predetermined values.

As the setting of the clip levels can be almost instantaneous (with respect to the bandwidth of the system ~2 MHz or ~500 ns), particularly in the first mode of operation, there is no significant loss of any portion of the received signal.

The present invention thus provides methods and apparatus in a near-field communication system, in which a modulated signal received in a Reader is clipped by applying upper and lower clip levels. After clipping, the modulated part of the signal corresponds to a greater portion of the overall signal, and thus the requirements placed on an analogue-to-digital converter for the clipped signal are reduced. In a first mode of operation, prior to or at the start of reception of the load-modulated signal, the clip levels may be set in a feedforward manner on the basis of preset values or a detected change in the overall signal; in a second mode of operation, once the clipped signal is available, the clip levels may be set in a feedback manner on the basis of the clipped signal.

Those skilled in the art will appreciate that various amendments and alterations can be made to the embodiments described above without departing from the scope of the invention as defined in the claims appended hereto.

The invention claimed is:

1. A near-field communication device for communicating with and powering a passive device, the near-field communication device comprising:
    an antenna;
    one or more amplitude limiters, arranged to apply upper and lower clip levels to a signal in the antenna, the signal comprising an unmodulated component for transmitting power to the passive device, and a modulated component corresponding to data transmitted by the passive device, the one or more amplitude limiters being further arranged to provide a clipped signal corresponding to a combination of a first portion of the signal below the lower clip level, and a second portion of the signal above the upper clip level; and
    processing circuitry, for demodulating the clipped signal.

2. The device as claimed in claim 1, wherein the processing circuitry comprises a low-pass filter configured to smooth the clipped signal.

3. The device as claimed in claim 1, wherein the processing circuitry comprises an analogue-to-digital converter (ADC) for converting the clipped signal into a digital signal.

4. The device as claimed in claim 1, further comprising a peak detector, configured to detect the peak amplitude of the signal in the antenna.

5. The device as claimed in claim 4, wherein the upper and lower clip levels are set at predetermined values relative to the peak amplitude.

6. The device as claimed in claim 4 wherein, in a first mode of operation, the upper and lower clip levels are set on the basis of a detected change in the peak amplitude of the signal in the antenna.

7. The device as claimed in claim 1, wherein the upper and lower clip levels are set on the basis of the peak amplitude of the clipped signal.

8. The device as claimed in claim 1, wherein the first and second portions of the signal comprise substantially only the modulated component of the signal.

9. A method of communicating with a passive device in a near-field communication system, the method comprising:
    applying upper and lower clip levels to a signal in an antenna, the signal comprising an unmodulated component for transmitting power to the passive device and a modulated component corresponding to data transmitted by the passive device, to provide a clipped signal corresponding to a combination of a first portion of the signal below the lower clip level, and a second portion of the signal above the upper clip level; and
    demodulating the clipped signal.

10. The method as claimed in claim 9, further comprising low-pass filtering the clipped signal.

11. The method as claimed in claim 9, further comprising converting the clipped signal into a digital signal.

12. The method as claimed in claim 9, further comprising detecting the peak amplitude of the signal in the antenna.

13. The method as claimed in claim 12, further comprising setting the upper and lower clip levels at predetermined values relative to the peak amplitude.

14. The method as claimed in claim 12, further comprising setting the upper and lower clip levels on the basis of a detected change in the peak amplitude of the signal in the antenna.

15. The method as claimed in claim 9, further comprising setting the upper and lower clip levels on the basis of the peak amplitude of the clipped signal.

* * * * *

UNITED STATES PATENT AND TRADEMARK OFFICE
CERTIFICATE OF CORRECTION

| | | |
|---|---|---|
| PATENT NO. | : 8,879,988 B2 | Page 1 of 1 |
| APPLICATION NO. | : 13/719434 | |
| DATED | : November 4, 2014 | |
| INVENTOR(S) | : McFarthing | |

It is certified that error appears in the above-identified patent and that said Letters Patent is hereby corrected as shown below:

In the Specification

In Column 4, Line 26, delete "filter 16." and insert -- filter 18. --, therefor.

Signed and Sealed this
Tenth Day of March, 2015

Michelle K. Lee
*Deputy Director of the United States Patent and Trademark Office*